United States Patent [19]

Shakespeare et al.

[11] Patent Number: 5,447,584

[45] Date of Patent: Sep. 5, 1995

[54] ARTICLES MADE FROM AN EDIBLE, WATER SOLUBLE COMPOSITION OF LOW DENSITY FOR USE IN TOYS, GAMES AND ARTS AND CRAFT PROJECTS

[75] Inventors: Terry A. Shakespeare, Lake View Terrace; David A. Molina, Rancho Cucamonga; Gwendolyn S. Shakespeare, Lake View Terrace, all of Calif.

[73] Assignee: Creative Capers Entertainment, Inc., Glendale, Calif.

[21] Appl. No.: 249,136

[22] Filed: May 25, 1994

[51] Int. Cl.$^6$ .................. A63H 33/04; A63H 33/06
[52] U.S. Cl. ..................... 156/63; 156/256; 156/258; 446/87; 446/386; 434/81; 434/82; 426/104
[58] Field of Search ............ 156/308.6, 308.8, , 156/256, 258, 63; 426/87, 104, 274; 446/386, 87, 88, 901; 434/81, 82

[56] References Cited

U.S. PATENT DOCUMENTS 2,482,986  9/1949  McClatchey et al. ............... 446/87

FOREIGN PATENT DOCUMENTS 5142290  6/1993  Japan ..................... 434/82
6083263  3/1994  Japan ..................... 434/81

*Primary Examiner*—Michael W. Ball
*Assistant Examiner*—Sam Chuan Yao
*Attorney, Agent, or Firm*—Blakely, Sokoloff, Taylor & Zafman

[57] ABSTRACT

The present invention provides a method of constructing an arts and crafts project using a water soluble composition of low density to make a plurality of child-safe articles. The invention is used for forming toys or construction materials for use in playing a game, constructing arts and crafts projects, or used as building blocks. The composition of the articles used in the invented method preferably comprises a matrix principally made from a food starch supplemented with polyalkylene glycol or a derivative thereof. Alternatively, the composition used in the invented method may also comprise a mixture of a grain, a biodegradable binding agent and water. The composition can be extruded in a sheet-like form, with the sheets being cut and bonded together through the application of water to create an art project. By applying water or moisture, the pieces formed by the invented method can be easily bonded together to create the desired article.

12 Claims, 2 Drawing Sheets

ARTICLES MADE FROM AN EDIBLE, WATER SOLUBLE COMPOSITION OF LOW DENSITY FOR USE IN TOYS, GAMES AND ARTS AND CRAFT PROJECTS

BACKGROUND OF THE INVENTION (1) Field of the Invention

The present invention relates to toys, games, and arts and crafts, and more specifically, to non-toxic, light weight, water soluble articles forming construction materials for use in toys, games and arts and crafts projects.

(2) Prior Art

In the materials commonly used for toys, games, and arts and crafts projects, several disadvantages exist in that the materials are normally either messy, difficult to use or dangerous to the children who play with them. For example, toy building blocks are quite popular with children who like to create structures of varying shapes and sizes. However, conventional building blocks are sometimes difficult for younger children to use in fabricating structures because they are held together by simple frictional fittings between the blocks which easily come apart. If the child is not careful, he may accidentally bump into the structure and cause it to fall apart with just a little force. Also, these types of building blocks are normally manufactured as small, hard objects which are often harmful to children when, for instance, they are swallowed or thrown at other children.

Additionally, other conventional building blocks have been designed such that the blocks are joined together by means of an adhesive material (i.e., mortar, glue, tape, etc.) placed between the blocks to hold them together. The disadvantages in using these types of blocks, however, is that the adhesive material 1) hardens to a point where the blocks cannot later be separated, 2) may be harmful or toxic if ingested and 3) is potentially quite messy and damaging to other things in the environment if proper supervision in the use of the adhesive is not undertaken.

Similarly, with arts and crafts materials such as modeling clays, paper mache, paints, crayons and markers, these types of materials often suffer from the disadvantages of being toxic, messy, difficult to dry and non-reusable. For example, certain kinds of modeling clays and paints are toxic, while they can also be very messy and difficult to remove from floor carpeting, wall paper, furniture fabrics and clothing. Furthermore, most arts and crafts projects require a significant amount of skill to actually construct the project and quite a bit of time in waiting for the adhesive to dry or bond, thereby taking the fun out of instant creation.

Accordingly, it would be desirable to provide child-safe articles for use in toys, games, arts and crafts projects and the like which comprise a light-weight, non-toxic material that enables the no-mess joining of articles together in the fabrication of structures, the creation of arts and crafts projects and the playing of games.

Starch based biodegradable materials of a consistency and density similar to packing material have been described in the prior art, such as, in U.S. Pat. Nos. 5,186,990; 5,185,382 and 5,208,267.

SUMMARY OF THE INVENTION

The present invention provides an edible, water soluble composition of low density which is manufactured into a plurality of child-safe articles forming toys or construction materials for use in playing a game or constructing an arts and crafts project. More particularly, the present invention is directed to building materials, such as building blocks and the like, which are attachable together by the application of water or other liquid, such as saliva, to the surfaces to be joined.

The composition of the articles preferably comprises a matrix principally made from a food starch supplemented with polyalkylene glycol or a derivative thereof, with the supplement forming approximately 10% of the total weight of the composition. Alternatively, the composition may also comprise a mixture of a grain, a biodegradable binding agent and water in the ratio of 80–97%, 0.5% and 14–16% by weight, respectively, with the mixture being prepared in an extrusion process at high temperatures. The material described herein may be found in the prior art.

Due to the properties of such compositions, the articles of the present invention are especially adapted for use by children since they are soft and foamy, they can be easily cut and joined together simply by applying water and they are both biodegradable and edible.

In terms of using the articles of the present invention as toy building blocks or for constructing arts and crafts projects, the articles can be formed in a plurality of shapes and sizes and then molded and/or joined together in a variety of ways to produce many unusual, easy to make structures and objects. In particular, if the composition is extruded in a sheet-like form, the sheets can be cut and bonded together with water (similar to using paper and tape) to create an art project. Additionally, the articles of the present invention can be marketed as a toy, game or hobby set in the form of pre-cut or pre-molded pieces of a model house, a model car, a jigsaw puzzle, or even, the facial features or bodily parts of a doll. Then, with the application of water, the pieces can be easily bonded together to create a model prototype, a picture, a doll and the like.

In an alternate embodiment of the present invention, a resilient, water soluble composition, such as the compositions described above, can be used to encase an object such as a gift or the like to form a surprise gift for a friend. To uncover the true nature of the gift, it is simply placed under a faucet or submerged in a container of water in order to dissolve the encasing layer of the composition.

It is therefore an object of the present invention to provide a plurality of articles having an edible, water soluble composition of low density, with the articles being manufactured in a variety of shapes and sizes for use as toys as well as materials used in games and arts and crafts projects.

It is another object of the present invention to provide edible, foam-like articles comprising an expanded, cellular, resilient material made from a starch substrate supplemented with a polyalkylene glycol or a derivative thereof (and/or a particulate bubble-nucleating agent), with the articles being formed in a variety of shapes, sizes and colors especially adapted for use in toys, games, arts and crafts projects and building blocks.

It is yet another object of the present invention to provide edible, foam-like articles made from a combination of grains, biodegradable binding agents and water in an extrusion process, with the articles being formed in a variety of shapes, sizes and colors especially adapted for use in toys, games, arts and crafts projects and building blocks.

It is a further object of the present invention to provide a method for constructing an arts and crafts project out of pieces of an expanded, cellular, compressible and resilient material made from an edible, water soluble composition of low density by wetting the corresponding contactual faces of the pieces and pressing the faces together to bond them.

It is yet a further object of the present invention to provide a method for concealing an article in a resilient, water soluble composition that can be later removed by dissolution to reveal the true nature of the article.

DETAILED DESCRIPTION OF THE INVENTION

Figure 1A:
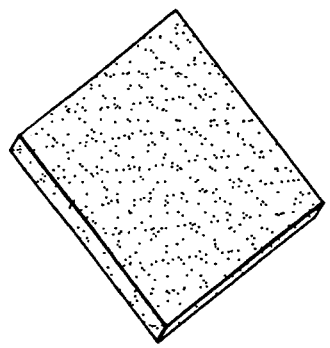
FIGS. 1a through 1d depict an exemplary plurality of shapes and sizes in which the articles of the present invention may be manufactured via extrusion.
Figure 1B:
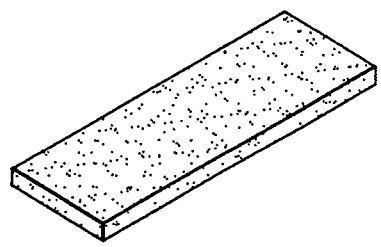
Figure 1C:
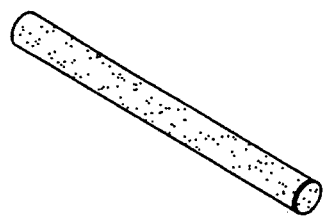
Figure 1D:
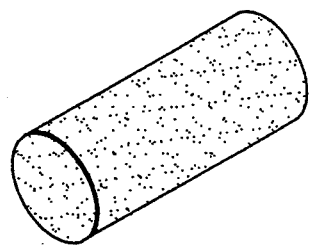
Figure 2A:
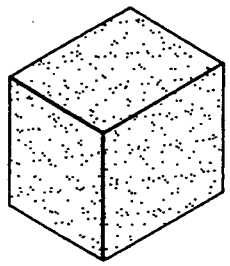
FIGS. 2a through 2e depict an exemplary plurality of shapes and sizes in which the articles of the present invention may be manufactured via injection molding.
Figure 2B:
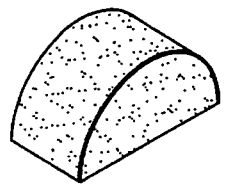
Figure 2C:
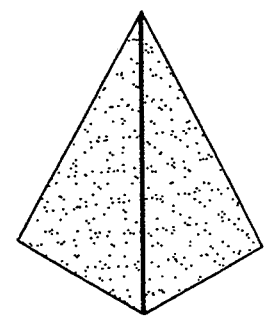
Figure 2D:
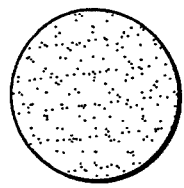
Figure 2E:
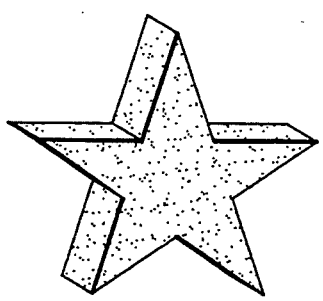

The present invention provides a plurality of articles in a plurality of shapes, sizes and colors comprising an edible, water soluble composition of low density for use in toys, games and arts and crafts projects. In the following description, for purposes of explanation and not limitation, specific details are set forth, such as particular compositions, properties, structures, etc. in order to provide a thorough understanding of the present invention. However, it will be apparent to one skilled in the art that the present invention may be practiced in other embodiments that depart from these specific details. In other instances, detailed descriptions of well-known structures, shapes, properties and techniques are omitted so as not to obscure the description of the present invention with unnecessary details.

In accordance with the present invention, an edible, water soluble composition of low density is utilized to manufacture child-safe articles such as toys or materials for use in playing games and constructing arts and crafts projects. The compositions utilized in the present invention are selected on the basis that they are easily dissolvable, non-toxic, biodegradable and relatively light in order to provide a safe and enjoyable means of amusement for children.

With regard to specific examples of such compositions, a first composition is described in U.S. Pat. Nos. 5,185,382 and 5,208,267 both issued to Neumann et al. The composition described therein is an improved starch product adapted for use as a packaging filler and comprises an expanded, cellular, compressible and resilient body having a matrix principally made up of starch and a polyalkylene glycol or a derivative thereof (the glycol forming approximately 10% of the total weight of the composition). The starch base, which itself may comprise variety of wheat or corn starches, can further be supplemented with a bubble-nucleating agent, either alone or in conjunction with the glycol, so as to enhance the bulk resiliency properties of the extruded article. The resulting extruded articles exhibit a bulk density between 0.6 and 2.0 lb/ft$^3$, a bulk compressibility between 0.04 and 0.4 kilo-newtons and a bulk resiliency between 40 and 75%.

A second composition, also forming a biodegradable and water soluble packaging material, is described in U.S. Pat. No. 5,186,990 issued to Starcevich. The composition comprises a mixture of grains (e.g., corn, rice, wheat, etc.), biodegradable binding agents and water in the ratio of 80–97%, 0.5% and 14–16% by weight, respectively. This mixture is extruded under high temperatures and subsequently allowed to expand into the final product.

By either extruding or injection molding one of the above-described compositions, or other edible, easily dissolvable and light weight compositions, articles of various shapes and sizes can be formed for specific uses. For instance, to produce toy building blocks or other materials for construction purposes, the composition can be extruded in planar, rectangular and cylindrical shapes of varying thicknesses and cut at various lengths, as is shown in FIGS. 1a through 1d. Alternatively, as shown in FIGS. 2a through 2e, the composition can be injection molded to produce blocks of odd shapes such as discs, stars, spheres, pyramids, tubes, roofing tiles and figurines (in both two and three dimensions). Additionally, during the manufacture of the composition, additives such as coloring dye, fragrances and flavorings can be added to the composition to make the resulting articles more interesting to children and more suitable for use in games and arts and crafts projects.

Building blocks made from the compositions set forth herein have several advantages when compared to conventional building blocks. First, they are soft and foamy so as to eliminate the usual risk of harm posed by conventional wooden or plastic blocks (i.e., from being thrown at people or fragile objects). Second, unlike normal building blocks which either cannot be joined together or require special (and normally toxic) adhesives, the building blocks of the present invention can be easily cut or joined together simply by applying water. To cut one of the blocks in half, either dripping water or a wetted instrument (i.e., a dull knife, spoon, etc.) can be applied along a seam until the composition is dissolved along that seam to a point where the pieces can be separated. To join two or more blocks together in new and unusual shapes and structures, the blocks to be joined only need to be moistened at the contacting faces and held together for a few seconds. Thus, the moistening can occur by means of a user licking the surface to be contacted, or wetting it with water or saliva, or other liquid. Users may find it particularly advantageous to dip their fingers in a container of water, or dip a brush in a container of water, and then wet the surfaces to be joined with the wet fingers or brush. Since the blocks are primarily comprised of food starches, they are not only biodegradable, but also edible. Hence, younger children may chew at and even swallow the building blocks, accidentally of course, without any real danger as the composition will immediately dissolve in the child's mouth.

In application of the above-described compositions to building materials for use in creating arts and crafts projects, the compositions can be formed into a plurality of articles as described above and then molded and/or joined together in a variety of ways to produce many unusual and easy to make structures and objects.

In particular, if the composition is extruded in a sheet-like form, the sheets can be cut and bonded together with water similar to paper and tape to create an art project. Additionally, the articles of the present invention could be used as a toy, game or hobby set in the form of pre-cut or pre-molded pieces of a model house, a model car, a jigsaw puzzle, or even, the facial features or bodily parts of a doll. Then, using a little water, the pieces can be bonded together to create a model prototype, a picture, a doll and the like.

Figure 3:
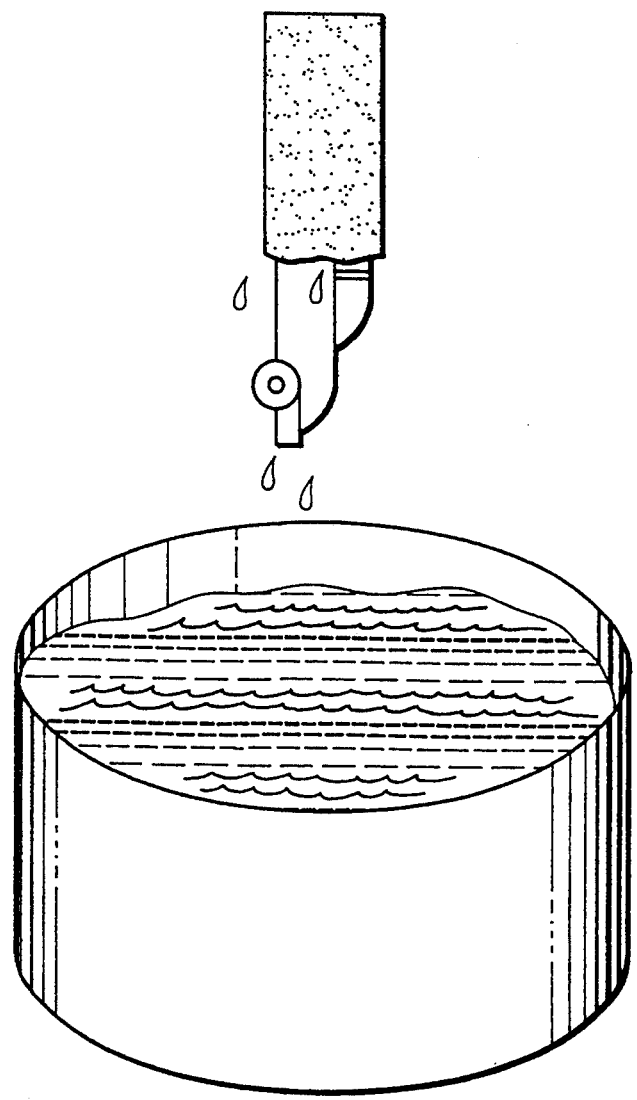
FIG. 3 depicts an object such as a toy car that has been encased in a resilient, water soluble composition, with the encasing being removed by submerging the encased object in water to reveal the true nature of the article.

In an alternate embodiment of the present invention, a resilient, water soluble composition, such as the compositions described above, can be used to encase an object such as a gift or the like to form a surprise gift for a friend. Then, as shown in FIG. 3, the true nature of the gift can be revealed simply by placing it under a faucet or submerging it in a container of water for a few seconds in order to dissolve the encasing layer. The object would be encased either at a factory or at home by means of coating the object with the composition, bonding sheets of the composition around the object or by placing the object in a concealed cavity of an article made from the composition. Obviously, this specific application of the composition would require that the gift be waterproof, or at least water resistant. Nonetheless, very little mess would be involved, and more advantageously, no toxic or non-biodegradable waste would be introduced into the environment.

It will be recognized that the above described invention may be embodied in other specific forms and may be used in a variety of applications for the safe amusement of children without departing from the spirit or essential elements of this disclosure. Thus, it is understood that the invention is not to be limited by the foregoing illustrative details, but rather is to be defined by the appended claims.

We claim:

1. A method for constructing an arts and crafts project, the method comprising the steps of:
   providing a sheet of an expanded, cellular, compressible and resilient material made from an edible, water soluble composition of low density;
   cutting the sheet into a plurality of pieces having corresponding contactual faces to be bonded together;
   wetting the corresponding contactual faces of the plurality of pieces; and
   pressing the corresponding contactual faces of the plurality of pieces together until the faces bond together to form the arts and crafts project.

2. The method of claim 1, wherein the arts and crafts project comprises a project selected from the group consisting of a model building, a model vehicle, a jigsaw puzzle and a doll.

3. A method for constructing an arts and crafts project, the method comprising the steps of:
   providing a plurality of articles comprising one of pre-cut pieces and pre-molded pieces of an arts and crafts project, the articles comprising an expanded, cellular, compressible and resilient material made from an edible, water soluble composition of low density;
   wetting corresponding contactual faces of the plurality of articles; and
   pressing the corresponding contactual faces of the plurality of articles together until the faces bond together to form the arts and crafts project.

4. The method of claim 3, wherein the arts and crafts project comprises a project selected from the group consisting of a model building, a model vehicle, a jigsaw puzzle and a doll, with the plurality of articles being selected from the group consisting of structural components of a building, structural components of a vehicle, pre-cut portions of a picture and physical features of a doll, respectively.

5. The method of claim 1, wherein the edible, water soluble composition of low density comprises a matrix principally made from a starch base supplemented with polyalkylene glycol or a derivative thereof, with the supplement forming approximately 10% of the total weight of the composition.

6. The method of claim 5, wherein the starch base comprises a starch selected from the group consisting of modified wheat and corn starches.

7. The method of claim 2, wherein the arts and crafts project comprises a bulk density between 0.6 and 2.0 lb/ft$^3$, a bulk compressibility between 0.04 and 0.4 kilonewtons and a bulk resiliency between 40 and 75%.

8. The method of claim 1, wherein the edible, water soluble composition comprises a mixture of a grain, a biodegradable binding agent and water in the ratio of 80–97%, 0.5% and 14–16% by weight, respectively, the mixture being prepared in an extrusion process at a temperature between 345° and 351° F.

9. The method of claim 3, wherein the edible, water soluble composition of low density comprises a matrix principally made from a starch base supplemented with polyalkylene glycol or a derivative thereof, with the supplement forming approximately 10% of the total weight of the composition.

10. The method of claim 9, wherein the starch base comprises a starch selected from the group consisting of modified wheat and corn starches.

11. The method of claim 4, wherein the arts and crafts project comprises a bulk density between 0.6 and 2.0 lb/ft$^3$, a bulk compressibility between 0.04 and 0.4 kilonewtons and a bulk resiliency between 40 and 75%.

12. The method of claim 3, wherein the edible, water soluble composition comprises a mixture of a grain, a biodegradable binding agent and water in the ratio of 80–97%, 0.5% and 14–16% by weight, respectively, the mixture being prepared in an extrusion process at a temperature between 345° and 351° F.

* * * * *